United States Patent [19]
Grebe

[11] Patent Number: 5,191,386
[45] Date of Patent: Mar. 2, 1993

[54] OPTICAL INSTRUMENT

[75] Inventor: Volker Grebe, Bochum, Fed. Rep. of Germany

[73] Assignee: Mesacon Gesellschaft fur Messtechnik mbH, Dortmund, Fed. Rep. of Germany

[21] Appl. No.: 783,342

[22] Filed: Oct. 28, 1991

[30] Foreign Application Priority Data

Oct. 26, 1990 [DE] Fed. Rep. of Germany ........ 9014814

[51] Int. Cl.⁵ ........................ G01P 3/36; G01R 23/16
[52] U.S. Cl. ............................. 356/28.5; 324/76.19; 324/76.41
[58] Field of Search ............... 324/77 B, 79 R; 356/28.5

[56] References Cited

U.S. PATENT DOCUMENTS

| | | | |
|---|---|---|---|
| 4,607,215 | 8/1986 | Takano et al. | 324/77 B |
| 4,696,568 | 9/1987 | Weistra | 356/28.5 |
| 4,916,383 | 4/1990 | Sayers et al. | 324/77 BX |
| 5,038,096 | 8/1991 | Obie et al. | 324/77 B |

FOREIGN PATENT DOCUMENTS 2173064A 10/1986 United Kingdom ................ 17/58

OTHER PUBLICATIONS

Gfrerer, M., "Berührungslose Geschwidigkeitsmessung mit Laserlicht," *messen+prüfen/automatik*, Dec., 1976, pp. 726-729.

*Primary Examiner*—Mark Hellner
*Attorney, Agent, or Firm*—Banner, Birch, McKie & Beckett

[57] ABSTRACT

The invention concerns a signal frequency processing device for measuring the frequency of an input signal, wherein the frequency is so much processed that it can be used for producing a TTL-compatible signal. The input signal is mixed with the frequency of a frequency generator and filtered by a band pass filter having a predetermined centre frequency. The resulting signal is mixed again with the oscillator signal of the frequency generator to provide a second intermediate signal. When this second intermediate signal has been passed through a second band pass filter an output signal is obtained which directly corresponds to the input frequency. Unlike in prior art, the control voltage of the frequency generator is not measured and evaluated as an output quantity, but instead the second intermediate frequency obtained in the second mixer.

6 Claims, 1 Drawing Sheet

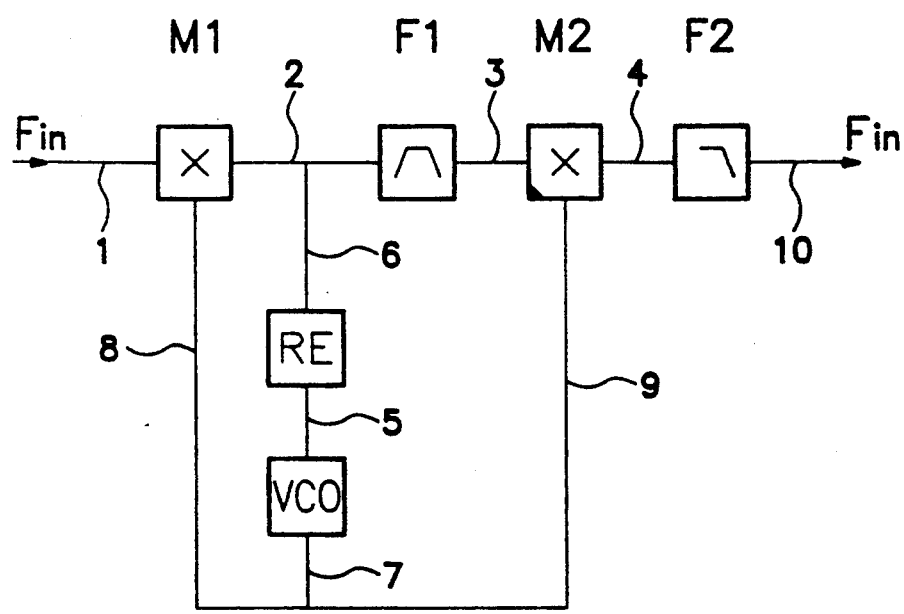

OPTICAL INSTRUMENT

BACKGROUND OF THE INVENTION

1. Field of the Invention

The invention relates to an optical instrument for measuring the speed or length of a moving surface, in which a measuring light beam from a laser is directed onto the surface and the Doppler-shifted stray light reflected by the surface and other light, e.g. non-Doppler-shifted laser light or some other Doppler-shifted laser light are superimposed for obtaining a beat, whose frequency forms a measure for the speed of the surface and is received and evaluated in the form of continuously supplied signals in an evaluation system and is in particular counted in a counting system.

2. Prior Art

The optical part of known instruments normally supplies a small, very noisy, intermittent signal in the HF range to the evaluation system, in which the signal must initially be filtered, so as to separate the signal component from the noise component. In order to reduce the noise band width a reduction of the overall band width of a noisy signal is sought, which makes it possible to improve the signal-to-noise (S/N) ratio, for which purpose a band pass filter is used. As the frequency of the continuously supplied signals is not constant, the centre frequency of the band pass filter must be correspondingly followed. Therefore a high selectivity band pass filter with variable centre frequency is required.

Alternatively, preference is frequently given to a highly selective crystal band pass filter with a stationary centre frequency. In order to be able to filter a variable frequency signal with such a band pass filter, either the band pass centre frequency must be moved over the spectrum, or the spectrum must be moved past a fixed band pass centre frequency. The moving of the spectrum past a fixed band-pass centre frequency is known as the heterodyne process. However, at the output, it supplies an output frequency, which is the same as the centre frequency of the band pass filter. If the control voltage of the frequency generator VCO is measured and evaluated as the output signal, the desired precision is not obtained with this system.

OBJECT OF THE INVENTION

Therefore a primary object of the invention is to filter the continuously applied, very noisy, intermittent signals received by the evaluation system in such a way that the information signal can be very accurately filtered out from the input signal with minimum effort and expenditure.

SUMMARY OF THE INVENTION

According to the invention this object is met by providing that for filtering the signals corresponding to an input frequency $F_{in}$ use is made of a band pass filter, particularly a crystal band pass filter with a fixed centre frequency, having a first mixer and having a frequency generator, where the input frequency $F_{in}$ can be mixed with an auxiliary frequency $F_{vco}$ continuously controlled by a controller in such a way that, much as in the heterodyne process, a first intermediate frequency $F_{vco}-F_{in}$ is formed, whose lower side band obtained by low pass filtering corresponds to the fixed centre frequency of the crystal band pass filter and that the first mixer and the first filter is followed by a second mixer, where the first intermediate frequency $F_{vco}-F_{in}$ can again be mixed with the continuously controlled auxiliary frequency $F_{vco}$ in such a way that a second intermediate frequency is obtained in accordance with the equation $$\sin((F_{vco}-F_{in})\cdot t)\cdot \sin(F_{vco}\,t) = \tfrac{1}{2}\cos((-F_{vco}+F_{vco}+F_{in})\cdot t) - \cos((F_{vco}-F_{in}+F_{vco})\cdot t)$$

whose lower side band frequency $F_{USB}$ obtained by low pass filtering and which is represented by the equation part $$F_{USB} = F_{vco} - F_{vco} + F_{in}$$

directly corresponds to the input frequency $F_{in}$.

Thus, according to the solution of the invention an automatic band pass filter is provided, in which the input frequencies obtained as very noisy signals are filtered and their S/N ratio is significantly improved. The vital advantage compared with the prior art is that signals can be obtained, which directly correspond to the input frequency $F_{in}$ and can be subsequently converted by conventional methods into a TTL-compatible square-wave signal.

Thus, unlike in the prior art, the control voltage of the frequency generator VCO is not measured and evaluated as an output quantity but instead the second intermediate frequency obtained in the second mixer which, as stated hereinbefore, automatically follows the original signal frequency.

The invention allows a high thermal stability, which increases the precision of the evaluation. There is a large band width of 10 MHz compared with the previous approximate 0.5 MHz. Finally, it is possible to obtain amplitude stability of the output signals without amplitude control. The filters have a constant group delay and consequently a good pulse response.

According to the invention, for moving the spectrum past the fixed band pass filter centre frequency in the first mixer the signal corresponding to the input frequency $F_{in}$ is firstly mixed with the auxiliary frequency $F_{vco}$. The latter is supplied by a voltage-controlled frequency generator VCO and a controller continuously controls the value of the auxiliary frequency $F_{vco}$ in such a way that the difference $F_{vco}-F_{in}$ continuously corresponds to the centre frequency. Thus, the following frequency spectrum is obtained:

$$\sin(F_{in}\,t)\cdot \sin(F_{vco}\,t) = \tfrac{1}{2}\cos((+F_{vco}-F_{in})\cdot t) - \cos((F_{vco}+F_{in})\cdot t)$$

The expression $F_{vco}-F_{in}$ corresponds to the desired first intermediate frequency, which is obtained by band pass filtering from the above frequency spectrum.

As the frequency $F_{vco}$ is continuously influenced by the controller in such a way that the lower side band or the first intermediate frequency $F_{vco}-F_{in}$ always corresponds to the centre frequency of the crystal band pass filter, the first intermediate frequency $F_{vco}-F_{in}$ passes through the band pass filter. Thus, the S/N ratio of the measuring signal is improved up to max. 90 dB. However, it has a modified frequency, which differs from the input frequency $F_{in}$, so that it cannot readily be further evaluated.

However, as stated, according to the invention this signal, namely the first intermediate frequency is again mixed in a second mixer with the auxiliary frequency $F_{vco}$ and this directly supplies a signal corresponding to the input frequency $F_{in}$ whose S/N ratio is significantly improved for transmission to the evaluation unit, where it is converted into a TTL-compatible square-wave signal.

The second mixing avoids the precision of the VCO control loop being involved in the result, because the auxiliary frequency $F_{vco}$ is no longer contained in the output signal, which corresponds to the lower side frequency of the second intermediate frequency.

BRIEF DESCRIPTION OF THE DRAWINGS

An embodiment of the invention is described hereinafter relative to the drawing.

It is obvious that the represented circuit only contains the most essential elements, which serve to directly illustrate the present embodiment.

DETAILED DESCRIPTION OF THE EMBODIMENT

An input line 1 leads to a first mixer M1 with which is connected in series via the line 2 a first filter F1. The filter F1 is connected via a line 3 to a second mixer M2, which is connected in series via a line 4 with a second filter F2. A continuously controlled frequency generator VCO connected by a line 5 to a controller RE is connected via lines 7, 8 to the first mixer M1 and via the line 7 and a further line 9 to the second mixer M2, in the manner shown in the drawing. A line 6 also connects the controller RE to the line 2 between the first mixer M1 and the first filter F1.

By means of the input line 1 the signals obtained from the optical unit which correspond to the input frequency $F_{in}$ pass into the first mixer M1, where they are mixed with an auxiliary frequency $F_{vco}$, which is continuously supplied by the frequency generator VCO and the following frequency spectrum is obtained:

$$\sin(F_{in}\cdot t)\cdot \sin(F_{vco}\cdot t) = \tfrac{1}{2}\cos(F_{vco}-F_{in})\cdot t) - \cos((F_{vco}+F_{in})\cdot t)$$

The result of this mixing is a lower side band $(F_{vco}-F_{in})$ and an upper side band $(F_{vco}+F_{in})$. The controller RE influences the auxiliary frequency $F_{vco}$ of the frequency generator VCO in such a way that the frequency of the lower side band $(F_{vco}-F_{in})$ becomes the same as the centre frequency of the crystal band-pass filter, which is used in the represented system, but not separately shown. Thus, the first intermediate frequency $F_{vco}-F_{in}$ can pass through the band pass filter and the S/N ratio of the measuring signal is improved. The frequency of the upper side band $(F_{vco}+F_{in})$ is filtered out by the first filter F1.

The intermediate frequency $F_{vco}-F_{in}$ now reaches the second mixer M2, where once again mixing takes place with the auxiliary frequency $F_{vco}$:

$$\sin((F_{vco}-F_{in})\cdot t)\cdot \sin(F_{vco}\cdot t) = \tfrac{1}{2}\cos((-F_{vco}+F_{vco}+F_{in})\cdot t) - \cos((F_{vco}-F_{in}+F_{vco})\cdot t)$$

Only the lower side band of this frequency or signal mixture is of interest and therefore the second filter F2 filters out the upper side frequency $F_{vco}+F_{in}$. This low pass filtering only leaves the lower side frequency:

$$F_{USB} = F_{vco} - F_{vco} + F_{in}$$

$$F_{USB} = F_{in}$$

Thus, the signal, whose S/N ratio has been improved to the extent necessary for further evaluation, leaves the band pass filter via the line 10 with a frequency exactly corresponding to the input frequency $F_{in}$.

Known means can now produce the TTL-compatibility of the signal.

What is claimed is:

1. A signal frequency processing device for measuring the frequency of an input signal, wherein the frequency of said input signal conveys information relative to a measured phenomenon, said device comprising:

signal input means for receiving said input signal;

frequency generator means for generating an oscillator signal;

mixer means coupled to said signal input means for receiving said input signal and to said frequency generator means for receiving said oscillator signal, said mixer means mixing said input signal with said oscillator signal to provide an intermediate signal having a frequency equal to the difference between the frequency of said input signal and the frequency of said oscillator;

a band pass filter having a predetermined center frequency coupled to said mixer means for receiving said intermediate frequency and passing only said intermediate frequency through to an output of said band pass filter;

control means coupled to the output of said band pass filter and to said frequency generator means for controlling the operation of said frequency generator means to provide an oscillator signal having a frequency which when mixed with said input signal provides said intermediate signal at a frequency substantially equal to the center frequency of said band pass filter, the frequency of said intermediate frequency signal being used to retrieve said information relative to said measure phenomenon;

a second mixer means coupled to said band pass filter for receiving said intermediate frequency signal and to said frequency generator means for receiving said oscillator signal, said second mixer means mixing said intermediate signal with said oscillator signal to provide a second intermediate signal having a frequency equal to the difference between the frequency of said intermediate signal and the frequency of said oscillator signal; and a second band pass filter coupled to said second mixer means for receiving said second intermediate frequency and passing only said intermediate frequency through to an output of said second band pass filter, the frequency of said second intermediate frequency signal being used to retrieve said information relative to said measured phenomenon.

2. A signal frequency processing device in accordance with claim 1, wherein said intermediate frequency is obtained in accordance with the relationship $$\sin(F_{in}\ t)\sin(F_{vco}\ t) = \tfrac{1}{2}\cos((F_{vco}-F_{in})\cdot t) - \cos((F_{vco}+F_{in})\cdot t)$$

where:

$F_{vco}$ = said oscillator frequency
$F_{in}$ = frequency of said input signal
$t$ = time.

3. A signal frequency processing device in accordance with claim 2, wherein said second intermediate frequency is in accordance with the relationship:

$$F_{USB} = F_{vco} - F_{vco} + F_{in}$$

and $$F_{USB} = F_{in}$$

where:
$F_{vco}$ = said oscillator frequency
$F_{in}$ = frequency of said input signal
$F_{USB}$ = is the sum of $F_{vco}$ and $F_{in}$.

4. A signal frequency processing device in accordance with claim 1, wherein said second intermediate frequency is obtained in accordance with the relationship $$\sin((F_{vco}-F_{in}) \cdot t) \cdot \sin(F_{vco} \cdot t) = \tfrac{1}{2}\cos((F_{vco}+F_{vco}+F_{in}) \cdot t) - \cos((F_{vco}-F_{in}+F_{vco}) \cdot t)$$

where:
$F_{vco}$ = said oscillator frequency
$F_{in}$ = frequency of said input signal
$t$ = time.

5. A signal frequency processing device in accordance with claim 2, wherein said second intermediate frequency is in accordance with the relationship:

$$F_{USB} = F_{vco} - F_{vco} + F_{in}$$

and $$F_{USB} = F_{in}$$

where:
$F_{vco}$ = said oscillator frequency
$F_{in}$ = frequency of said input signal
$F_{USB}$ = is the sum of $F_{vco}$ and $F_{in}$.

6. In an optical instrument for measuring a physical phenomenon associated with a moving surface, wherein a measuring light beam is directed onto said surface and the Doppler-shifted light reflected by said surface combines with other light to obtain a beat signal having a frequency representative of the measured phenomenon, and wherein said beat signal serves as an input signal to evaluation means for evaluating said beat signal to retrieve the magnitude of said measured phenomenon, the improvement comprising:

signal input means for receiving said input signal;

frequency generator means for generating an oscillator signal;

mixer means coupled to said signal input means for receiving said input signal and to said frequency generator means for receiving said oscillator signal, said mixer means mixing said input signal with said oscillator signal to provide an intermediate signal having a frequency equal to the difference between the frequency of said input signal and the frequency of said oscillator;

a band pass filter having a predetermined center frequency coupled to said mixer means for receiving said intermediate frequency and passing only said intermediate frequency through to an output of said band pass filter; and control means coupled to the output of said band pass filter and to said frequency generator means for controlling the operation of said frequency generator means to provide an oscillator signal having a frequency which when mixed with said input signal provides said intermediate signal at a frequency substantially equal to the center frequency of said band pass filter, the frequency of said intermediate frequency signal being used to retrieve said information relative to said measured phenomenon.

* * * * *